US008850787B2

(12) United States Patent
Fujita et al.

(10) Patent No.: US 8,850,787 B2
(45) Date of Patent: Oct. 7, 2014

(54) HYBRID THERMAL POWER GENERATION SYSTEM AND METHOD OF CONSTRUCTING SAME

(75) Inventors: Takumi Fujita, Tokyo (JP); Masayoshi Horino, Tokyo (JP); Isao Takekoh, Tokyo (JP); Jun Minase, Tokyo (JP); Yusuke Kamemura, Tokyo (JP)

(73) Assignee: Sumitomo Corporation, Tokyo (JP)

( * ) Notice: Subject to any disclaimer, the term of this patent is extended or adjusted under 35 U.S.C. 154(b) by 859 days.

(21) Appl. No.: 13/078,611

(22) Filed: Apr. 1, 2011

(65) Prior Publication Data

US 2011/0289897 A1    Dec. 1, 2011

(30) Foreign Application Priority Data

May 27, 2010   (JP) ................................. 2010-121679
Sep. 1, 2010   (JP) ................................. 2010-196086

(51) Int. Cl.
*F02C 6/00* (2006.01)
*F02C 7/22* (2006.01)

(52) U.S. Cl.
USPC .................... 60/39.15; 60/39.182; 60/39.461

(58) Field of Classification Search
CPC ............... F02C 9/40; F02C 3/20; F02C 7/22; F02C 6/00; F02C 6/02
USPC .......... 60/39.463, 39.461, 39.182, 39.15, 791
See application file for complete search history.

(56) References Cited

U.S. PATENT DOCUMENTS 4,092,825 A * 6/1978 Egan ................................ 60/781
4,341,069 A * 7/1982 Bell et al. ................... 60/39.182

2005/0155909 A1* 7/2005 Inomata et al. ............... 208/211
2008/0104938 A1* 5/2008 Finkenrath et al. ............. 60/791
2009/0308788 A1* 12/2009 Lenglet ............................ 208/57

FOREIGN PATENT DOCUMENTS

| JP | 06-207180 A | 7/1994 |
| JP | 09-317407 A | 12/1997 |
| JP | 10-47015 A | 2/1998 |
| JP | 11-132009 A | 5/1999 |
| JP | 11-270354 A | 10/1999 |
| JP | 2000-273467 A | 10/2000 |
| JP | 2000-282069 A | 10/2000 |
| JP | 2001-73715 A | 3/2001 |
| JP | 2009-248081 A | 10/2009 |
| WO | 00/26325 A1 | 5/2000 |

OTHER PUBLICATIONS

International Searching Authority, Translation of the International Preliminary Report on Patentability issued in corresponding International Application No. PCT/JP2011/062269, dated Dec. 13, 2012.
Japanese Patent Office as an International Searching Authority, Search Report dated Jul. 19, 2011, in counterpart application PCT/JP2011/062269.

* cited by examiner

*Primary Examiner* — Ted Kim
(74) *Attorney, Agent, or Firm* — Sughrue Mion, PLLC

(57) ABSTRACT

A hybrid thermal power generation system using crude oil as a fuel comprises a combined cycle power generation system for generating power by supplying naphtha and light oil separated by an atmospheric distillation column alone into different gas turbines and using steam produced by exhaust heat and a conventional power generation system for generating power by burning heavy oil separated by the atmospheric distillation column alone.

9 Claims, 4 Drawing Sheets

HYBRID THERMAL POWER GENERATION SYSTEM AND METHOD OF CONSTRUCTING SAME

BACKGROUND OF THE INVENTION

1. Field of the Invention

The present invention relates to a hybrid thermal power generation system using crude oil as a fuel and a method of constructing the hybrid thermal power generation system.

2. Related Background Art

As conventional thermal power generation systems, those generating power by using crude oil as a fuel have been known. For example, conventional power generation systems burn crude oil in a boiler, so as to produce steam, which drives a steam turbine, thereby generating power. However, the conventional power generation systems are hard to yield sufficient power generation efficiency. Hence proposed are combined cycle power generation systems which produce a gas turbine fuel oil from crude oil and burn thus produced gas turbine fuel oil in a gas turbine, thereby generating power (see Patent Literatures 1 to 3, for example). The systems disclosed in Patent Literatures 1 to 3 manufacture the gas turbine fuel oil from the crude oil through atmospheric and vacuum distillation columns. The gas turbine fuel oil is fractionally distilled as light oil having a boiling point lower than 350° C. to 400° C. from the crude oil.

Patent Literature 1: Japanese Patent Application Laid-Open No. 2000-273467

Patent Literature 2: Japanese Patent Application Laid-Open No. 2000-282069

Patent Literature 3: International Publication No. 00/26325

SUMMARY OF THE INVENTION

The thermal power generation systems disclosed in Patent Literatures 1 to 3 are based on the presupposition that power is generated by utilizing the combined cycle power generation systems alone. This makes it necessary to extract the fuel oil for the gas turbine as much as possible from the crude oil by repeating the distillation process as described in Patent Literatures 1 to 3 in order to improve the energy efficiency per unit crude oil.

However, when extracting the gas turbine fuel as much as possible from the crude oil, unburned hydrocarbon may be mixed into the distilled fuel oil for the gas turbine. When the fuel oil containing the unburned hydrocarbon is burned in the gas turbine, soot occurs. Thus generated soot may block cooling air holes of turbine blades, whereby the gas turbine may fail to function.

Therefore, in order to secure the stability in power supply while improving the energy efficiency per unit crude oil, it is necessary for the thermal power generation systems disclosed in Patent Literatures 1 to 3 to extract the fuel oil as much as possible from the crude oil while taking account of the unburned hydrocarbon mixed therein. For accomplishing such a condition, a sophisticated distillation process and control is necessary, which complicates the thermal power generation systems and raises the cost.

On the other hand, the thermal power generation systems disclosed in Patent Literatures 1 to 3 extract light oil having a boiling point lower than 350° C. to 400° C. as the fuel oil for the gas turbine from the crude oil, whereby naphtha extractable at a lower temperature than the light oil is in a state mixed with the light oil extractable at a higher temperature than the naphtha. However, the mixing ratio between the light oil and naphtha and their homogeneity vary, whereby the burning of the gas turbine may become unstable when such a fuel is employed as the fuel oil for the gas turbine. Therefore, in the conventional systems, the reliability of the gas turbine may deteriorate, thereby inhibiting long-term stable power generation, while making them hard to operate efficiently.

In order to overcome such technical problems, it is an object of the present invention to provide, in a thermal power generation system using crude oil, a hybrid thermal power generation system which can easily achieve an improvement in energy efficiency per unit crude oil and early establishment of stability in power supply, and a method of constructing the same.

The inventor conducted diligent studies and, as a result, has taken notice of an approach of using the whole crude oil as a fuel instead of extracting the gas turbine fuel as much as possible from the crude oil and found that using a combined cycle power generation system and a conventional power generation system together can easily achieve an improvement in energy efficiency per unit crude oil and early establishment of stability in power supply and that, for yielding this effect, it is important for the distillation process to be carried out by an atmospheric distillation column alone. The inventor has further found it preferable to separate naphtha and light oil from each other and feed them to different gas turbines in order to achieve the improvement in energy efficiency per unit crude oil and early establishment of stability in power supply more easily.

That is, the hybrid thermal power generation system in accordance with the present invention is a hybrid thermal power generation system using crude oil as a fuel, the hybrid thermal power generation system comprising a desalting apparatus for desalting the crude oil; an atmospheric distillation column for separating the crude oil desalted by the desalting apparatus into naphtha, light oil, and heavy oil; a combined cycle power generation system for generating power by driving a first gas turbine using the naphtha separated by the atmospheric distillation column as a fuel, a second gas turbine using the light oil separated by the atmospheric distillation column as a fuel, and a steam turbine with steam produced by utilizing exhaust heat from the first and second gas turbines; and a conventional power generation system for generating power by burning the heavy oil separated by the atmospheric distillation column in a boiler and driving a steam turbine with the steam produced by the boiler; wherein the fuels for the combined cycle power generation system and conventional power generation system are separated from the crude oil by using the atmospheric distillation column alone; and wherein a surplus of the naphtha for the first gas turbine or a surplus of the light oil for the second gas turbine is fed to the boiler of the conventional power generation system.

Since the hybrid thermal power generation system in accordance with the present invention performs a distillation process by using an atmospheric distillation column alone, a process of separating naphtha and light oil from crude oil within such a range as to prevent unburned hydrocarbon from being mixed therein can be achieved in a simple structure. Further, performing the distillation process by using the atmospheric distillation column alone makes it possible for the concentration of impurities contained in heavy oil to fall within a range where they are easily burnable by a boiler. Hence, a combined cycle power generation system and a conventional power generation system can be used together without remarkably losing their operating efficiencies, whereby power can be supplied stably.

Using the combined cycle power generation system and conventional power generation system together also makes it possible to generate power by employing the naphtha and both of the light oil and heavy oil separated from the crude oil. Since power can be generated by a gas turbine using the naphtha and light oil, a power generation efficiency higher than that in the case employing the conventional power generation system alone can be obtained. Though the amount of the resulting gas turbine fuel becomes smaller than in the case where the distillation process is repeated, thereby lowering the amount of power generation as compared with that case, power can be generated by the conventional power generation system using the heavy oil containing unseparated gas turbine fuel. Therefore, power can be generated such as to compensate for the decrease in power generation amount without sophisticated control or distillation process. Hence, an improvement in energy efficiency per unit crude oil and early establishment of stability in power supply can easily be achieved in a thermal power generation system using crude oil.

Since the fuel for gas turbines is separated into naphtha and light oil through the atmospheric distillation column, so as to be fed to different gas turbines, the gas turbines can be prevented from being supplied with fuels in which the naphtha and light oil are mixed. Therefore, it is unnecessary for gas turbines to be configured in conformity to mixed fuels, so that the individual gas turbines can easily be set such as to be operable efficiently according to the naphtha and light oil respectively supplied thereto, while the operation can be kept from becoming unstable because of nonuniformity in mixed fuels. On the other hand, feeding a surplus of the naphtha or a surplus of the light oil to the boiler makes it possible for the conventional power generation system to generate power by utilizing a surplus of the fuel from the combined cycle power generation system. Hence, power can be generated efficiently by utilizing both of the combined cycle power generation system and conventional power generation system.

Here, the steam turbine of the combined cycle power generation system may comprise a first steam turbine utilizing the exhaust heat of the first gas turbine and a second steam turbine utilizing the exhaust heat of the second gas turbine.

Such a structure provides independent combined cycle power generation systems for the respective gas turbines. Therefore, for example, one combined cycle power generation system can be stopped while the other combined cycle power generation system is operated, whereby they can be maintained easily. Even when one combined cycle power generation system is stopped by a trouble, the other combined cycle power generation system is not affected thereby but can be operated continuously in a stable manner.

The atmospheric distillation column may be connected to a first supply path for supplying the fractionally distilled naphtha to the first gas turbine, a second supply path for supplying the fractionally distilled light oil to the second gas turbine, and a third supply path for supplying the fractionally distilled heavy oil to the boiler, wherein the first or second supply path may be connected to the third supply path so that the surplus of naphtha or the surplus of light oil can be supplied to the boiler.

Preferably, the atmospheric distillation column separates the naphtha and light oil acceptable as the fuels for the first and second gas turbines from the crude oil according to specifications required for the first and second gas turbines.

Such a structure enables the naphtha and light oil conforming to the specifications required for gas turbines to be acquired from the crude oil without being separated in excess, and supplied to the gas turbines. Since the naphtha and light oil are not separated from the crude oil in excess as such, the heavy oil obtained as residual oil does not contain heavy metals and the like at high concentrations and thus can easily satisfy specifications required for the boiler.

The hybrid thermal power generation system may further comprise a first desalination apparatus for performing desalination by using the steam issued from at least one of the steam turbine of the combined cycle power generation system and the steam turbine of the conventional power generation system.

Such a structure enables the first desalination apparatus to produce fresh water from salt water by using exhaust heat from the steam turbine and thus can further improve the energy efficiency per unit crude oil.

The hybrid thermal power generation system may further comprise a second desalination apparatus for performing desalination by using the power issued from at least one of the combined cycle power generation system and the conventional power generation system. The first and second desalination apparatus may be used together.

The method of constructing a hybrid thermal power generation system in accordance with the present invention is a method of constructing a hybrid thermal power generation system using crude oil as a fuel, the method comprising a first construction step of constructing a desalting apparatus for desalting the crude oil, an atmospheric distillation column for separating the crude oil desalted by the desalting apparatus into naphtha, light oil, and heavy oil, and a combined cycle power generation system for generating power by driving a first gas turbine using the naphtha separated by the atmospheric distillation column as a fuel, a second gas turbine using the light oil separated by the atmospheric distillation column as a fuel, and a steam turbine with steam produced by utilizing exhaust heat from the first and second gas turbines; a second construction step of constructing a conventional power generation system for generating power by driving a boiler using the heavy oil separated by the atmospheric distillation column as a fuel and driving a steam turbine with the steam produced by the boiler; and a third construction step of arranging a supply path for feeding a surplus of the naphtha for the first gas turbine or a surplus of the light oil for the second gas turbine to the boiler of the conventional power generation system after the first and second construction steps are completed; wherein the first and second construction steps are performed in parallel.

By performing the first construction step of constructing the desalting apparatus, atmospheric distillation column, and combined cycle power generation system and the second construction step of constructing the conventional power generation system in parallel, the method of constructing a hybrid thermal power generation system in accordance with the present invention makes it possible to operate the combined cycle power generation system in a simple cycle at the time when the construction of gas turbine by the first construction step is completed without waiting for the completion of the construction by the second construction step or in a combined cycle after the completion of the combined power generation system by the first construction step, for example. This makes it possible to generate power before the whole hybrid thermal power generation system is completed, whereby power can be supplied earlier than in the case constructing the conventional power generation system alone. Providing a supply path for feeding the fuel of the combined cycle power generation system to the conventional power generation system enables efficient operations using both of the combined cycle power generation system and conventional power generation system.

The present invention can easily achieve, in a thermal power generation system using crude oil, an improvement in energy efficiency per unit crude oil and early establishment of stability in power supply.

DESCRIPTION OF THE PREFERRED EMBODIMENTS

Figure 1:
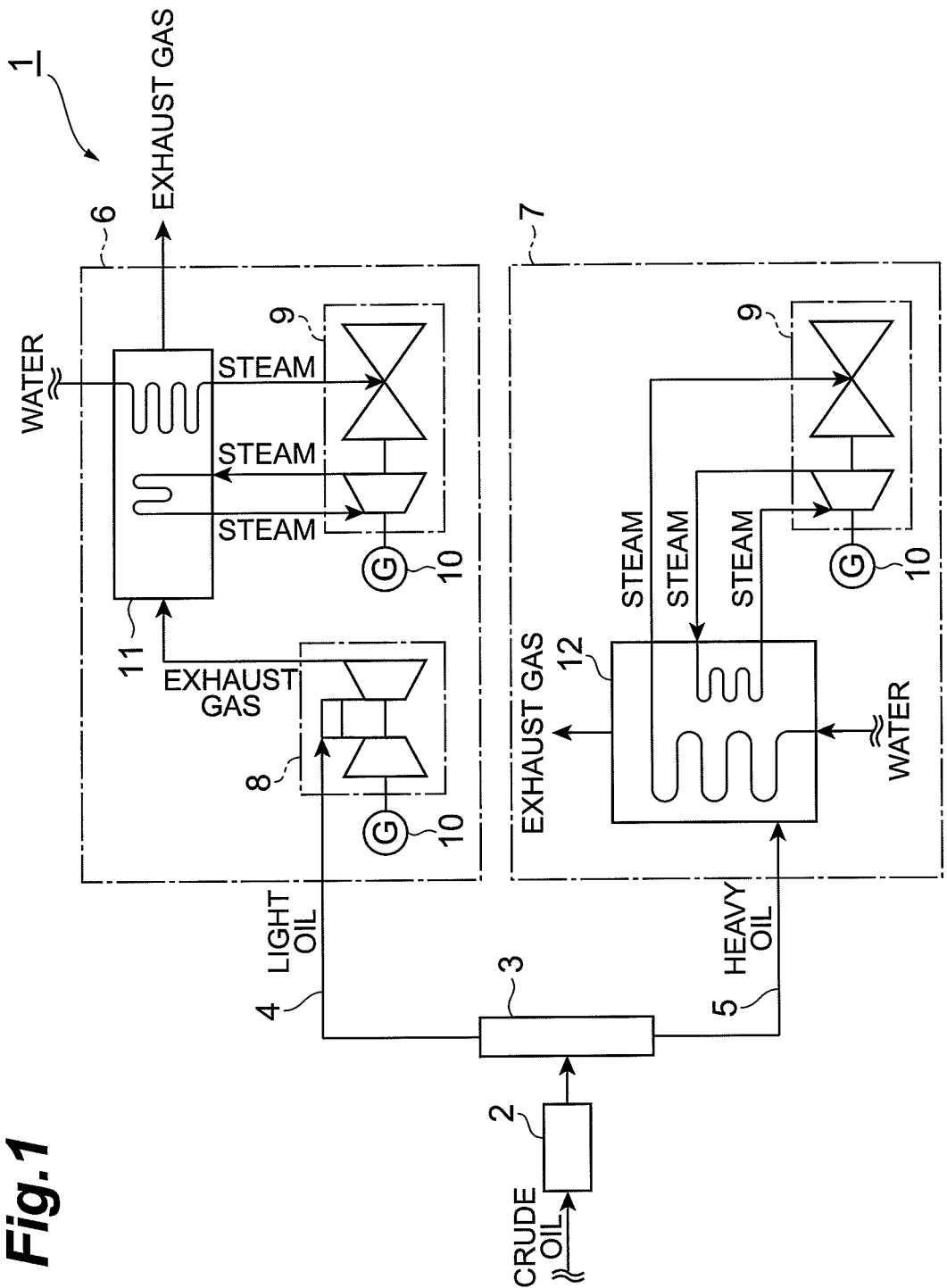
FIG. 1 is a structural diagram of the hybrid thermal power generation system in accordance with a first reference example.

In the following, preferred embodiments of the present invention will be explained in detail with reference to the drawings. In the drawings, the same or equivalent parts will be referred to with the same signs while omitting their overlapping explanations.

First Reference Example

The hybrid thermal power generation system in accordance with this reference example is suitably employed as a thermal power generation system using crude oil as a fuel.

FIG. 1 is a structural diagram of the hybrid thermal power generation system in accordance with this reference example. As illustrated in FIG. 1, the hybrid thermal power generation system 1 comprises a desalting apparatus 2, an atmospheric distillation column 3, a combined cycle power generation system 6, and a conventional power generation system 7.

The desalting apparatus 2 is connected to a crude oil tank, for example, and desalts the crude oil fed from the crude oil tank. For example, the desalting apparatus 2 washes the crude oil with water added thereto and separates a water layer therefrom. The desalting apparatus 2 also supplies the atmospheric distillation column 3 with the crude oil from which impurities and salt were removed.

The atmospheric distillation column 3 performs fractional distillation of the crude oil fed from the desalting apparatus 2. The atmospheric distillation column 3 comprises a heating furnace, a boiler, and a main distillation column, for example. The main distillation column receives the crude oil having evaporated its low-boiling components by heating to about 350° C. with the heating furnace. The main distillation column also receives steam from the boiler. The main distillation column distills the crude oil at a pressure slightly higher than the atmospheric pressure, so as to separate it into light oil acceptable as a gas turbine fuel and its residual oil, i.e., heavy oil. Here, according to specifications required for a gas turbine, the atmospheric distillation column 3 fractionally distills the light oil acceptable as the gas turbine fuel. The light oil with which the gas turbine can operate stably is defined by its flash point, Reid vapor pressure, pour point, distillation temperature, specific gravity, density, viscosity, lower heating value, hydrocarbon ratio, cetane index, residual carbon, bottom deposit (water), and contents of trace metals (sodium, potassium, vanadium, lead, and the like), for example. The heavy oil as the residual oil has been distilled only once and thus is acceptable as a boiler fuel. The separated light oil is fed to the combined cycle power generation system 6 through a light oil supply system 4, while the separated heavy oil is supplied to the conventional power generation system 7 through a heavy oil supply system 5. Thus, the fuels for the combined cycle power generation system and conventional power generation system are separated from the crude oil by the atmospheric distillation column 3 alone.

The combined cycle power generation system 6 comprises a gas turbine 8, a steam turbine 9, generators 10, and an exhaust heat recovery boiler 11.

The gas turbine 8 burns the light oil, introduced therein through the light oil supply system 4, in compressed air, so as to yield a high-temperature, high-pressure gas, thereby rotating its rotor at high speed. The gas turbine 8 is connected to one generator 10. The generator 10 converts the kinetic energy of the rotating rotor into electric energy. This enables the gas turbine 8 to generate power. The exhaust gas emitted from the gas turbine 8 is fed to the exhaust heat recovery boiler 11.

The exhaust heat recovery boiler 11 receives the high-temperature exhaust gas from the gas turbine 8 and performs heat exchange between supplied water and the exhaust gas, so as to produce steam. The exhaust heat recovery boiler 11 may further receive a high-temperature gas emitted from the atmospheric distillation column 3. The steam turbine 9 is connected to the exhaust heat recovery boiler 11, so that the produced steam is fed to the steam turbine 9.

The steam turbine 9 rotates its rotor at high speed with the steam fed from the exhaust heat recovery boiler 11. The steam turbine 9 is connected to the other generator 10. The generator 10 converts the kinetic energy of the rotating rotor into electric energy. This enables the steam turbine 9 to generate power. A reheat cycle steam turbine may be used as the steam turbine 9.

Thus, the combined cycle power generation system 6 generates power by driving the gas turbine 8 using the light oil separated by the atmospheric distillation column 3 and by driving the steam turbine 9 with the steam produced by utilizing the exhaust heat from the gas turbine 8.

On the other hand, the conventional power generation system 7 comprises a boiler 12, a steam turbine 9, and a generator 10. The boiler 12 burns the heavy oil introduced therein through the heavy oil supply system 5, so as to convert supplied water into steam. The steam turbine 9 is connected to the boiler 12, so that the produced steam is fed to the steam turbine 9. The steam turbine 9 and the generator 10 are constructed as mentioned above.

Thus, the conventional power generation system 7 generates power by burning the heavy oil separated by the atmospheric distillation column 3 in the boiler 12 and driving the steam turbine 9 with the steam produced by the boiler 12.

As mentioned above, the hybrid thermal power generation system 1 uses the combined cycle power generation system 6 and conventional power generation system 7 together, while the fuels fed to these systems are distilled by the atmospheric distillation column 3 alone.

Operations and effects of the hybrid thermal power generation system in accordance with this reference example will now be explained. The supplied crude oil is desalted by the desalting apparatus 2 and then is separated by the atmospheric distillation column 3 into light oil and heavy oil. The light oil is fed to the gas turbine 8 of the combined cycle power generation system 6 through the light oil supply system 4, so as to be utilized as a fuel for the gas turbine 8. This yields power through the generator 10 connected to the gas turbine 8. The exhaust gas from the gas turbine 8 is fed to the exhaust heat recovery boiler 11, so as to exchange heat with water supplied to the exhaust heat recovery boiler 11, thereby producing steam. The steam drives the steam turbine 9, whereby power is generated through the generator 10. Thus, power can be obtained by utilizing the exhaust heat from the gas turbine 8. On the other hand, the heavy oil is fed to the boiler 12 of the conventional power generation system 7 through the heavy oil supply system 5, so as to be utilized as a fuel. As a consequence, the water supplied to the exhaust heat recovery boiler 11 becomes steam. The steam drives the steam turbine 9, whereby power is obtained through the generator 10. Thus, each of the light oil and heavy oil separated by the atmospheric distillation column 3 is employed as a fuel for generating power. This can easily achieve an improvement in energy efficiency per unit crude oil and early establishment of stability in power supply. According to the results of simulations conducted by the inventor, the hybrid thermal power generation system 1 improved the power generation efficiency by about 5% (relative value) over a typical conventional power generation system. The hybrid thermal power generation system 1 was also seen to be able to cut down $CO_2$ by about 5% (relative value) as compared with the typical conventional power generation system. Hence, the hybrid thermal power generation system 1 was proved to be effective in cutting down $CO_2$ while saving energy.

As in the foregoing, the hybrid thermal power generation system 1 in accordance with the first reference example performs the distillation process by using the atmospheric distillation column 3 alone and thus can easily prevent impurities such as unburned hydrocarbon from entering, while achieving the process of separating the light oil from the crude oil in a simple structure. Since the distillation process is performed by the atmospheric distillation column 3 alone, the concentration of impurities contained in the heavy oil can fall within a range where they can easily be burned by the boiler. Therefore, the combined cycle power generation system 6 and conventional power generation system 7 can be used together without remarkably losing their operating efficiencies, whereby power can be supplied stably. Using the combined cycle power generation system 6 and conventional power generation system 7 together makes it possible to generate power by employing both of the light oil and heavy oil separated from the crude oil. Since the gas turbine 8 can generate power by using the light oil, a power generation efficiency higher than that in the case employing the conventional power generation system 7 alone can be obtained. On the other hand, though the amount of the light oil becomes smaller than in the case where the distillation process is repeated, thereby lowering the amount of power generation in the combined cycle power generation system 6 as compared with that case, power can be generated by the conventional power generation system 7 using the heavy oil containing unseparated light oil. Therefore, power can be generated such as to compensate for the decrease in power generation amount without sophisticated control or distillation process. Hence, in a thermal power generation system using crude oil, an improvement in energy efficiency per unit crude oil and early establishment of stability in power supply can easily be achieved in a power generation plant. Since an improvement in energy efficiency per unit crude oil and early establishment of stability in power supply can be achieved without using an atmospheric distillation column and a vacuum distillation column together, the equipment cost and operation/maintenance cost can be cut down, which is advantageous in terms of economy. The hybrid thermal power generation system 1 in accordance with the first reference example can satisfy an important item that power can be supplied stably at low price, which is required as an infrastructure for living.

Further, in the hybrid thermal power generation system 1 in accordance with the first reference example, the light oil suitable for specifications required for the gas turbine 8 is acquired by the atmospheric distillation column 3 without being separated in excess from the crude oil, so as to be fed to the gas turbine 8. Since the light oil is thus kept from being separated in excess from the crude oil, the heavy oil obtained as the residual oil from the atmospheric distillation column 3 does not contain heavy metals and the like at high concentrations and thus can easily satisfy specifications required for the boiler 12.

A method of constructing the hybrid thermal power generation system 1 in accordance with this reference example will now be explained. The method constructs the combined cycle power generation system 6 and the conventional power generation system 7 separately in parallel. In general, the combined cycle power generation system 6 is constructed in a shorter period than the conventional power generation system 7. Therefore, when the first construction step of constructing the combined cycle power generation system 6 and the second construction step of constructing the conventional power generation system 7 are started at the same time and performed in parallel, the combined cycle power generation system 6 can be completed earlier. The hybrid thermal power generation system 1 can operate the combined cycle power generation system 6 and the conventional power generation system 7 independently from each other and thus can operate the combined cycle power generation system 6 earlier so as to supply power at once without waiting for the completion of the conventional power generation system 7. The method of constructing the hybrid thermal power generation system 1 makes it possible to supply power about 18 months earlier than a typical conventional power generation system by a simple cycle operation of the gas turbine 8 and about 7 months earlier than the typical conventional power generation system by a combined cycle operation. Thus, the period from starting the construction to supplying power can be shortened.

As in the foregoing, by performing the first construction step of constructing the desalting apparatus 2, atmospheric distillation column 3, and combined cycle power generation system 6 and the second construction step of constructing the conventional power generation system 7 in parallel, the method of constructing the hybrid thermal power generation system 1 in accordance with the first reference example makes it possible to operate the combined cycle power generation system 6 at the time when the construction by the first construction step is completed without waiting for the completion of the construction by the second construction step, for example. This makes it possible to generate power before the whole hybrid thermal power generation system 1 is completed, whereby power can be supplied earlier than in the case constructing the conventional power generation system 7 alone.

Second Reference Example

The hybrid thermal power generation system 20 in accordance with the second reference example is constructed substantially the same as the hybrid thermal power generation system in accordance with the first reference example except that it further comprises desalination apparatus having a desalinating function. Therefore, explanations of the hybrid thermal power generation system 20 concerning points overlapping those in the hybrid thermal power generation system 1 will be omitted.

Figure 2:
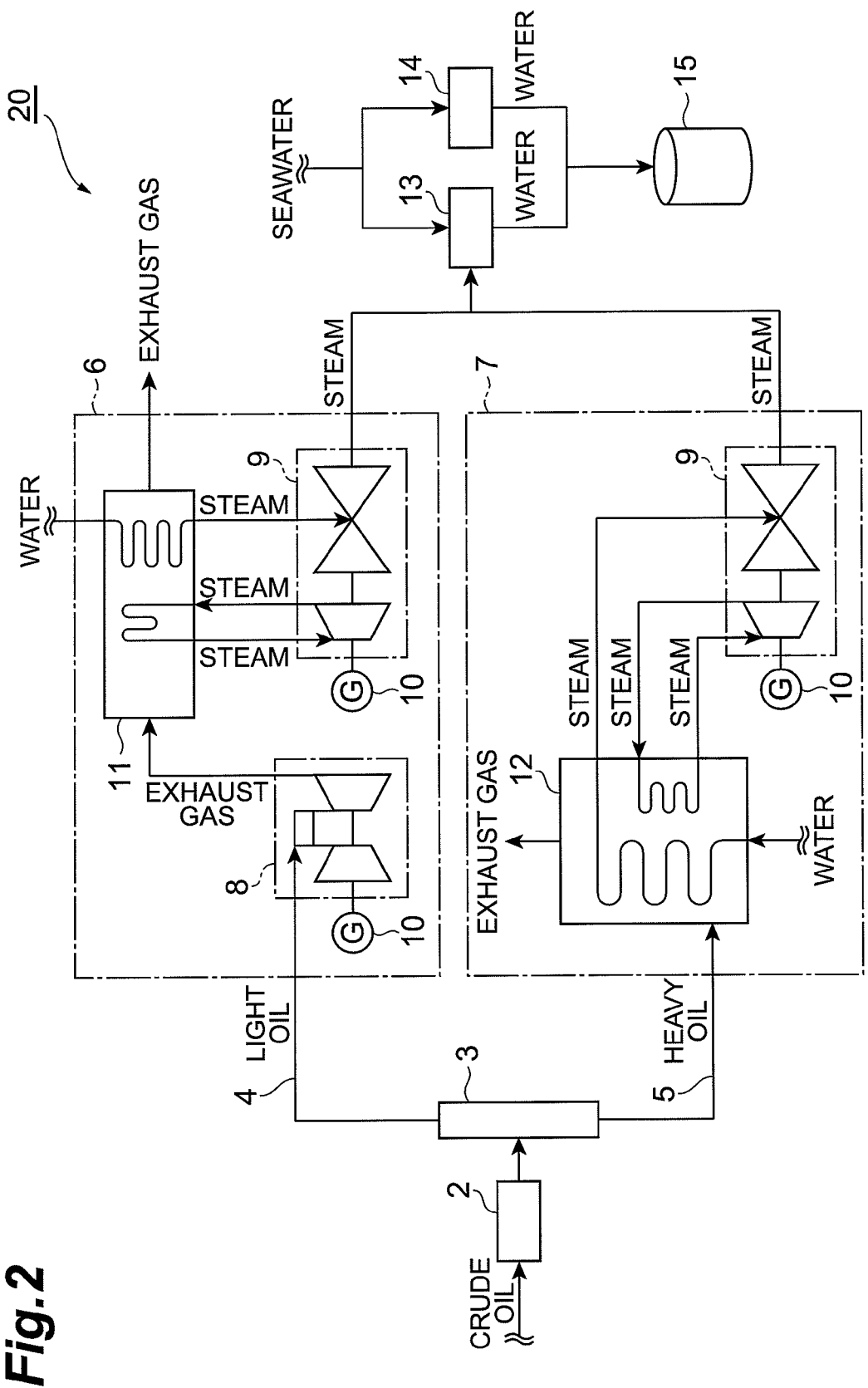
FIG. 2 is a structural diagram of the hybrid thermal power generation system in accordance with a second reference example.

First, the structure of the hybrid thermal power generation system 20 in accordance with the second reference example will be explained. FIG. 2 is a structural diagram of the hybrid thermal power generation system 20 in accordance with the second reference example. As illustrated in FIG. 2, the hybrid thermal power generation system 20 in accordance with the second reference example is constructed substantially the same as the hybrid thermal power generation system 1 except that it further comprises desalination apparatus 13, 14 and a reservoir tank 15.

The desalination apparatus (first desalination apparatus) 13 is connected to the steam turbine 9 of the combined cycle power generation system 6 and the steam turbine 9 of the conventional power generation system 7. Using the high-temperature steam fed from each steam turbine 9, the desalination apparatus 13 evaporates seawater or brine, so as to produce distilled water. Examples of the evaporation method employable in the desalination apparatus 13 include multi-stage flash distillation (MSF) and multi-effect desalination (MED). The desalination apparatus 13 stores the resulting distilled water into the reservoir tank 15. Thus, the desalination apparatus 13 produces fresh water from salt water by utilizing the exhaust heat from the hybrid thermal power generation system 20. Thus produced water is used for consumers, industries, agriculture, irrigation, and the like. After the heat exchange, the steam becomes water, which is fed again to the exhaust heat recovery boiler 11 and the boiler 12.

The desalination apparatus (second desalination apparatus) 14 impregnates a predetermined membrane with seawater or brine, so as to produce fresh water. An example of the membrane method employable in the desalination apparatus 14 is reverse osmosis membrane (RO). The desalination apparatus 14 stores thus produced fresh water into the reservoir tank 15.

The desalination apparatus 13, 14 are supplied with necessary power from at least one of the combined cycle power generation system 6 and conventional power generation system 7. The remaining parts of the structure are the same as those in the hybrid thermal power generation system 1 in accordance with the first reference example.

As in the foregoing, the hybrid thermal power generation system 20 in accordance with the second reference example yields the same effects as with the hybrid thermal power generation system 1 in accordance with the first reference example, while the desalination apparatus 13 can produce fresh water from seawater or brine by utilizing the exhaust heat from the steam turbine 9. Therefore, it can totally enhance the thermal efficiency, thereby further improving the energy efficiency per unit crude oil.

First Embodiment

The hybrid thermal power generation system 30 in accordance with the first embodiment is constructed substantially the same as the hybrid thermal power generation system 1 in accordance with the first reference example 1 except that the atmospheric distillation column 3 separates the crude oil into naphtha, light oil, and heavy oil, that respective gas turbines are provided for the naphtha and the light oil, and that a surplus of the fuel for the combined cycle power generation system 6 is fed to the conventional power generation system 7. Therefore, explanations of the hybrid thermal power generation system 30 in accordance with the first embodiment concerning points overlapping those in the hybrid thermal power generation system 1 will be omitted.

Figure 3:
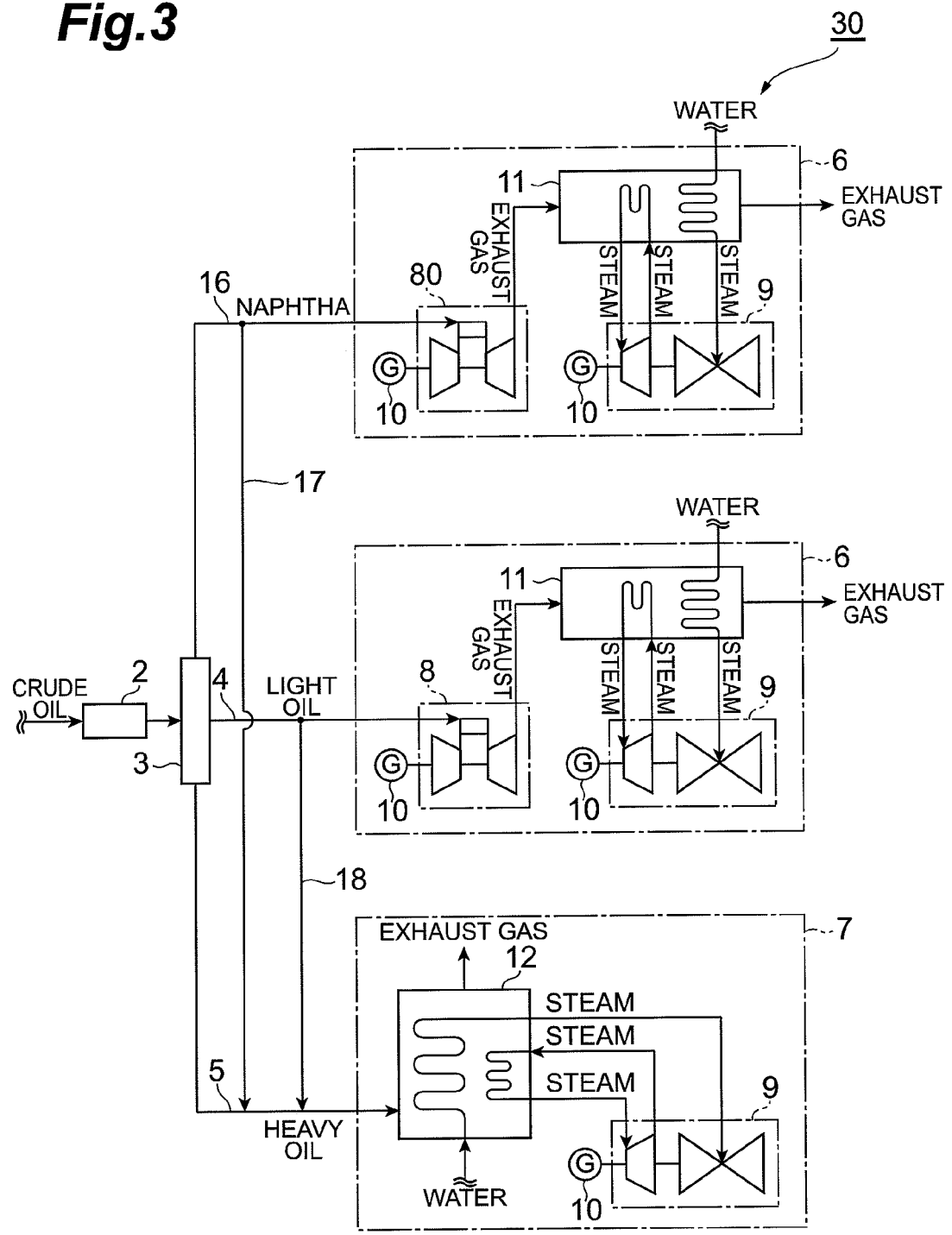
FIG. 3 is a structural diagram of the hybrid thermal power generation system in accordance with a first embodiment.

To begin with, the structure of the hybrid thermal power generation system 30 in accordance with the first embodiment will be explained. FIG. 3 is a structural diagram of the hybrid thermal power generation system 30 in accordance with the first embodiment. As illustrated in FIG. 3, the hybrid thermal power generation system 30 in accordance with the first embodiment is constructed substantially the same as the hybrid thermal power generation system 1 but differs therefrom in the function of the atmospheric distillation column 3 and in that it comprises a plurality of combined cycle power generation systems 6 and a supply path 17.

The atmospheric distillation column 3 is constructed the same as with the atmospheric distillation column 3 of the hybrid thermal power generation system 1 and separates the crude oil into naphtha, light oil, and heavy oil. For example, it fractionally distills the naphtha within the range of 30° C. to 180° C. and the light oil within the range of 180° C. to 350° C. and separates therefrom the residual oil as the heavy oil. The separated naphtha is fed to a first gas turbine 80 of the combined cycle power generation systems 6 through a naphtha supply system (first supply path) 16. The separated light oil is fed to a second gas turbine 8 of the combined cycle power generation systems 6 through a light oil supply system (second supply path) 4. The separated heavy oil is fed to the boiler 12 of the conventional power generation system 7 through a heavy oil supply system (third supply path) 5. Thus, fuels for the combined cycle power generation systems and conventional power generation system are separated from the crude oil by the atmospheric distillation column 3 alone.

The gas turbines 8, 80 are configured such that fuels fed thereto burn efficiently. Since the naphtha and light oil differ from each other in terms of burning characteristics and viscosity, the atomizing nozzle diameters and injection pressures of gas turbines are preconfigured separately for the naphtha and light oil.

In the hybrid thermal power generation system 30, the naphtha supply system 16 is connected to the heavy oil supply system 5 through the supply path 17, whereby a surplus of the naphtha which is left unburned by the first gas turbine 80 is fed to the boiler 12 through the supply path 17. The light oil supply system 4 is connected to the heavy oil supply system 5 through the supply path 18, so that a surplus of the light oil which is left unburned by the second gas turbine 8 is fed to the boiler 12 through the supply path 18.

As mentioned above, the hybrid thermal power generation system 30 uses a plurality of combined cycle power generation systems 6 and the conventional power generation system 7 together, while the fuels supplied to these systems are distilled by the atmospheric distillation column 3 alone.

Operations and effects of the hybrid thermal power generation system 30 in accordance with this embodiment will now be explained. The supplied crude oil is desalted by the desalting apparatus 2 and then is separated by the atmospheric distillation column 3 into naphtha, light oil, and heavy oil. The naphtha is fed to the first gas turbine 80 of the combined cycle power generation systems 6 through the naphtha supply system 16, so as to be utilized as a fuel for the first gas turbine 80. As a consequence, power is obtained through a generator 10 connected to the first gas turbine 80. The light oil is fed to the second gas turbine 8 of the combined cycle power generation system 6 through the light oil supply system 4, so as to be utilized as a fuel for the second gas turbine 8. As a consequence, power is obtained through a generator 10 connected to the second gas turbine 8. Exhaust gases from the gas turbines 8, 80 are fed to respective exhaust heat recovery boilers 11 and exchange heat with water supplied to the exhaust heat recovery boilers 11, thereby producing steam. The steam drives steam turbines 9 of the combined cycle power generation systems 6, whereby power is obtained through the generators 10. Thus, power can be obtained by utilizing the exhaust heat from the gas turbines 8, 80. On the other hand, the heavy oil is fed to the boiler 12 of the conventional power generation system 7 through the heavy oil supply system 5, so as to be utilized as a fuel. The steam generated by boiler 12 drives a steam turbine 9 of the conventional power generation system 7, whereby power is obtained through a generator 10. A surplus of the naphtha for the first gas turbine 80 is fed to the boiler 12 through the supply path 17, so as to be utilized as a fuel for the boiler 12. A surplus of the light oil for the second gas turbine 8 is fed to the boiler 12 through the supply path 18, so as to be utilized as a fuel for the boiler 12. Thus, each of the naphtha, light oil, and heavy oil separated by the atmospheric distillation column 3 is employed as a fuel for power generation. This can easily achieve an improvement in energy efficiency per unit crude oil and early establishment of stability in power supply.

As in the foregoing, the hybrid thermal power generation system 30 in accordance with the first embodiment performs the distillation process by using the atmospheric distillation column 3 alone and thus can easily prevent impurities such as unburned hydrocarbon from entering, while achieving the process of separating the naphtha and light oil from the crude oil in a simple structure. Since the distillation process is performed by the atmospheric distillation column 3 alone, the concentration of impurities contained in the heavy oil can fall within a range where they can easily be burned by the boiler. Therefore, the combined cycle power generation systems 6 and conventional power generation system 7 can be used together without remarkably losing their operating efficiencies, whereby power can be supplied stably. Using the combined cycle power generation systems 6 and conventional power generation system 7 together makes it possible to generate power by employing the naphtha and both of the light oil and heavy oil separated from the crude oil. Since power can be generated by the gas turbines 8, 80 using the naphtha and light oil, respectively, a power generation efficiency higher than that in the case employing the conventional power generation system 7 alone can be obtained. Though the amount of light oil obtained becomes smaller than in the case where the distillation process is repeated, thereby lowering the amount of power generation in the combined cycle power generation systems 6 as compared with that case, power can be generated by the conventional power generation system 7 using the heavy oil containing unseparated naphtha and light oil. Therefore, power can be generated such as to compensate for the decrease in power generation amount without sophisticated control or distillation process. Hence, an improvement in energy efficiency per unit crude oil and early establishment of stability in power supply can easily be achieved in a power generation plant in a thermal power generation system using crude oil. Since an improvement in energy efficiency per unit crude oil and early establishment of stability in power supply can be achieved without using an atmospheric distillation column and a vacuum distillation column together, the equipment cost and operation/maintenance cost can be cut down, which is advantageous in terms of economy.

In the hybrid thermal power generation system 30 in accordance with the first embodiment, the fuel for the gas turbines 8, 80 is separated by the atmospheric distillation column 3 into naphtha and light oil, which are fed to the respective gas turbines 8, 80, whereby the gas turbines 8, 80 are kept from being supplied with fuels in which the naphtha and light oil are mixed. Therefore, the gas turbines 8, 80 can easily be configured such as to enable efficient operations in conformity to the naphtha and light oil fed thereto instead of being adapted to fuels which are variable in terms of mixing ratio and uniformity, while being prevented from operating unstably because of nonuniformity in mixed fuels. Feeding a surplus of the naphtha or a surplus of the light oil to the boiler 12 makes it possible to utilize a surplus of fuels for the combined cycle power generation systems 6 in order to generate power in the conventional power generation system 7. Hence, power can efficiently be generated by using both of the combined cycle power generation systems 6 and conventional power generation system 7. Thus, the hybrid thermal power generation system 30 in accordance with the first embodiment can satisfy an important item that power can be supplied stably at low price, which is required as an infrastructure for living.

In the thermal power generation system 30 in accordance with the first embodiment, the combined cycle power generation systems 6 are separately provided for the respective gas turbines 8, 80. Therefore, for example, one combined cycle power generation system 6 can be stopped while the other combined cycle power generation system 6 is operated, whereby they can be maintained easily. Even when one combined cycle power generation system 6 is stopped by a trouble, the other combined cycle power generation system 6 is not affected thereby but can be operated continuously in a stable manner.

In the thermal power generation system 30 in accordance with the first embodiment, the naphtha and light oil conforming to the specifications required for the gas turbines 8, 80 can be acquired by the atmospheric distillation column 3 from the crude oil without being separated in excess, and supplied to the gas turbines 8, 80. Since the naphtha and light oil are not separated from the crude oil in excess as such, the heavy oil obtained as residual oil from the atmospheric distillation column 3 does not contain heavy metals and the like at high concentrations and thus can easily satisfy specifications required for the boiler 12.

A method of constructing the hybrid thermal power generation system 30 in accordance with this embodiment will now be explained. The method of constructing the hybrid thermal power generation system 30 is substantially the same as that of the hybrid thermal power generation system 1 in accordance with the first reference example 1 except that it further comprises a third construction step of arranging the supply path 17 after the completion of the first and second construction steps. Therefore, as in the hybrid thermal power generation system 1 in accordance with the first reference example, the combined cycle power generation systems 6 can be operated so as to supply power at once without waiting for the completion of the conventional power generation system 7. When the combined cycle power generation systems 6 and the conventional power generation system 7 are completed, the supply path 17 for feeding the conventional power generation system 7 with a surplus of the naphtha for the combined cycle power generation systems 6 is provided, whereby an approach of generating power efficiently by using the whole crude oil becomes more a reality.

As in the foregoing, by performing the first construction step of constructing the desalting apparatus 2, atmospheric distillation column 3, and combined cycle power generation systems 6 and the second construction step of constructing the conventional power generation system 7 in parallel, the method of constructing the hybrid thermal power generation system 30 in accordance with the first embodiment makes it possible to operate the combined cycle power generation systems 6 at the time when the construction by the first construction step is completed without waiting for the completion of the construction by the second construction step, for example. Therefore, power can be generated before the completion of the hybrid thermal power generation system 30 as a whole, whereby power can be generated earlier than in the case constructing the conventional power generation system 7 alone. Providing the supply path 17 for feeding the conventional power generation system 7 with the fuels of the combined cycle power generation systems 6 enables efficient operations by using both of the combined cycle power generation systems 6 and conventional power generation system 7.

Second Embodiment

The hybrid thermal power generation system 40 in accordance with the second embodiment is constructed substantially the same as the hybrid thermal power generation system 30 in accordance with the first embodiment except that it further comprises desalination apparatus having a desalinating function. Therefore, explanations of the hybrid thermal power generation system 40 concerning points overlapping those in the hybrid thermal power generation system 30 will be omitted.

Figure 4:
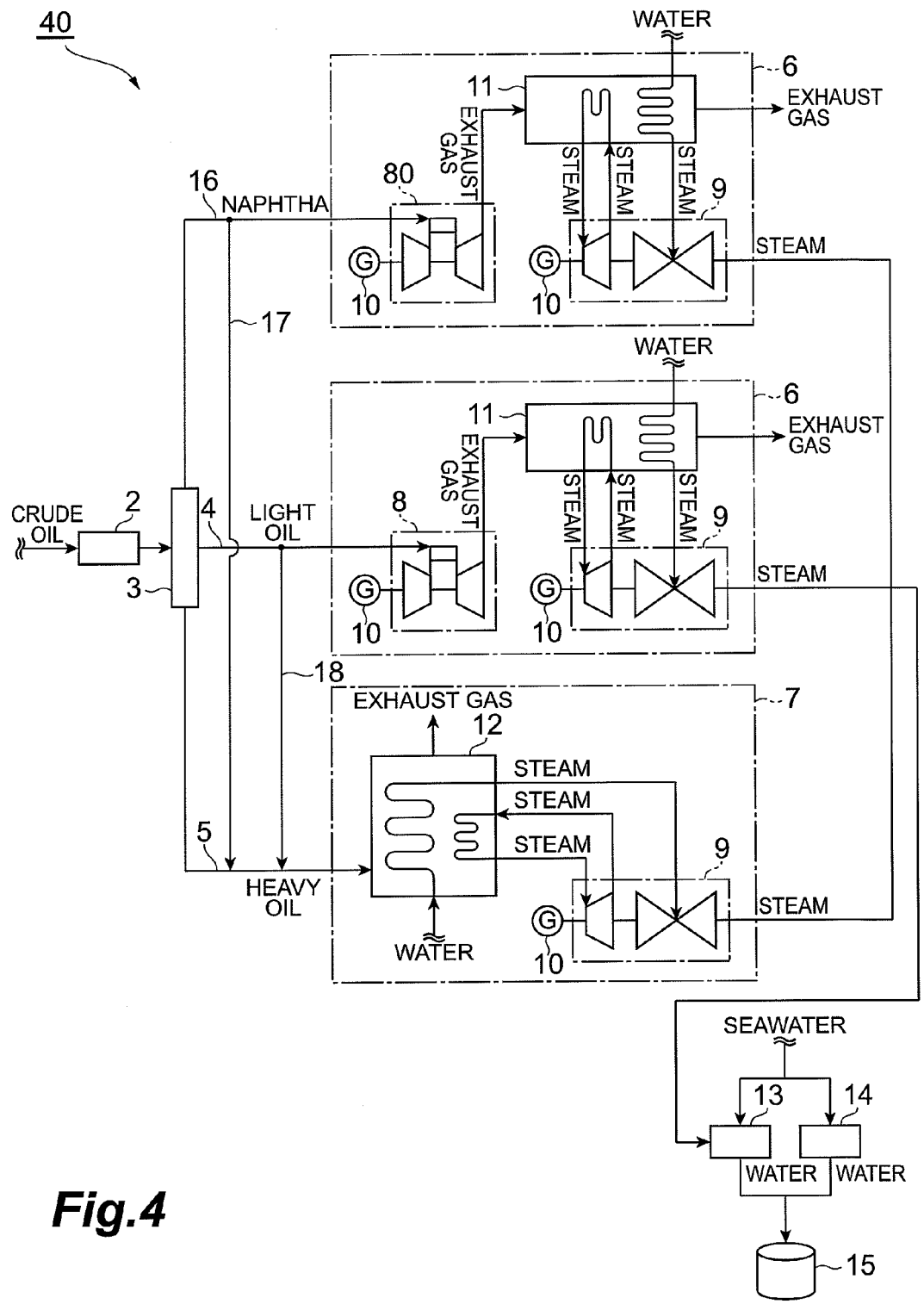
FIG. 4 is a structural diagram of the hybrid thermal power generation system in accordance with a second embodiment.

First, the structure of the hybrid thermal power generation system 40 in accordance with the second embodiment will be explained. FIG. 4 is a structural diagram of the hybrid thermal power generation system 40 in accordance with the second embodiment. As illustrated in FIG. 4, the hybrid thermal power generation system 40 in accordance with the second embodiment is constructed substantially the same as the hybrid thermal power generation system 30 except that it further comprises desalination apparatus 13, 14 and a reservoir tank 15. The structures of the desalination apparatus 13, 14 and reservoir tank 15 are the same as those in the second reference example and thus will not be explained.

As in the foregoing, the hybrid thermal power generation system 40 in accordance with the second embodiment yields the same effects as with the hybrid thermal power generation system 30 in accordance with the first embodiment, while the desalination apparatus 13 can produce fresh water from seawater or brine by utilizing the exhaust heat from the steam turbine 9. Therefore, it can totally enhance the thermal efficiency, thereby further improving the energy efficiency per unit crude oil.

Though preferred embodiments of the present invention are specifically explained in the foregoing, each embodiment just illustrates an example of the hybrid thermal power generation system in accordance with the present invention. The hybrid thermal power generation system in accordance with the present invention is not limited to the hybrid thermal power generation systems 1, 20, 30, 40 in accordance with the above-mentioned embodiments.

While the above-mentioned embodiments relate to examples in which the light oil separated by the atmospheric distillation column 3 is utilized by the combined cycle power generation systems 6 without any processing, the light oil separated by the atmospheric distillation column 3 may be fed to the combined cycle power generation systems 6 after being subjected to processes other than the distillation, e.g., a process of removing impurities by hydrogenation.

Though each of the second reference example and second embodiment relates to a case where the desalination apparatus 13 is connected to both of the steam turbines 9 of the combined cycle power generation system 6 and conventional power generation system 7, it may be connected to one of them.

While each of the second reference example and second embodiment relates to a case equipped with the desalination apparatus 13, 14, the desalination apparatus 14 may be provided alone or omitted.

The desalination apparatus 13 explained in the second reference example and second embodiment may be constructed in parallel with the first and second construction steps explained in the first reference example and first embodiment.

Though each of the first and second embodiments relates to a system including a plurality of combined cycle power generation systems 6, while different steam turbines (first and second steam turbines) 9 are connected to the gas turbines 8, 80, the exhaust heat recovery boiler 11, steam turbine 9, and generator 10 connected to the gas turbines 8, 80 may be used in common, so as to construct a single combined cycle power generation system. This can further cut down the construction cost.

While the first and second embodiments relate to examples in which both of a surplus of the naphtha and a surplus of the light oil are fed to the boiler 12, one of the supply paths 17, 18 may be provided alone, so as to feed only one of a surplus of the naphtha and a surplus of the light oil to the boiler 12.

REFERENCE SIGNS LIST 1, 20, 30, 40 . . . hybrid thermal power generation system; 2 . . . desalting apparatus; 3 . . . atmospheric distillation column; 4 . . . light oil supply system; 5 . . . heavy oil supply system; 6 . . . combined cycle power generation system; 7 . . . conventional power generation system; 8, 80 . . . gas turbine; 9 . . . steam turbine; 10 . . . generator; 11 . . . exhaust heat recovery boiler; 12 . . . boiler; 13, 14 . . . desalination apparatus; 15 . . . reservoir tank; 16 . . . naphtha supply system; 17, 18 . . . supply path

What is claimed is:

1. A hybrid thermal power generation system using crude oil as a fuel, the hybrid thermal power generation system comprising:
   a desalting apparatus for desalting the crude oil;
   an atmospheric distillation column for separating the crude oil desalted by the desalting apparatus into naphtha, light oil, and heavy oil;
   a combined cycle power generation system for generating power by driving a first gas turbine using the naphtha separated by the atmospheric distillation column as a fuel, a second gas turbine using the light oil separated by the atmospheric distillation column as a fuel, and a steam turbine with steam produced by utilizing exhaust heat from the first and second gas turbines; and
   a conventional power generation system for generating power by burning the heavy oil separated by the atmospheric distillation column in a boiler and driving a steam turbine with the steam produced by the boiler;
   wherein the fuels for the combined cycle power generation system and conventional power generation system are separated from the crude oil by using the atmospheric distillation column alone; and
   wherein a surplus of the naphtha for the first gas turbine or a surplus of the light oil for the second gas turbine is fed to the boiler of the conventional power generation system.

2. The hybrid thermal power generation system according to claim 1, wherein the steam turbine comprises a first steam turbine utilizing the exhaust heat of the first gas turbine and a second steam turbine utilizing the exhaust heat of the second gas turbine.

3. The hybrid thermal power generation system according to claim 2, wherein the atmospheric distillation column is connected to a first supply path for supplying the fractionally distilled naphtha to the first gas turbine, a second supply path for supplying the fractionally distilled light oil to the second gas turbine, and a third supply path for supplying the fractionally distilled heavy oil to the boiler;

wherein the first or second supply path is connected to the third supply path so that the surplus of naphtha or the surplus of light oil can be supplied to the boiler.

4. The hybrid thermal power generation system according to claim 3, wherein the atmospheric distillation column separates the naphtha and light oil acceptable as the fuels for the first and second gas turbines from the crude oil according to specifications required for the first and second gas turbines.

5. The hybrid thermal power generation system according to claim 2, wherein the atmospheric distillation column separates the naphtha and light oil acceptable as the fuels for the first and second gas turbines from the crude oil according to specifications required for the first and second gas turbines.

6. The hybrid thermal power generation system according to claim 1, wherein the atmospheric distillation column separates the naphtha and light oil acceptable as the fuels for the first and second gas turbines from the crude oil according to specifications required for the first and second gas turbines.

7. The hybrid thermal power generation system according to claim 1, further comprising a first desalination apparatus for performing desalination by using the steam issued from at least one of the steam turbine of the combined cycle power generation system and the steam turbine of the conventional power generation system.

8. The hybrid thermal power generation system according to claim 1, further comprising a second desalination apparatus for performing desalination by using the power issued from at least one of the combined cycle power generation system and the conventional power generation system.

9. The hybrid thermal power generation system according to claim 1, further comprising a first desalination apparatus for performing desalination by using the steam issued from at least one of the steam turbine of the combined cycle power generation system and the steam turbine of the conventional power generation system; and a second desalination apparatus for performing desalination by using the power issued from at least one of the combined cycle power generation system and the conventional power generation system.

* * * * *